J. H. MEARS.
Rake for Harvester.
No. 6,454. Reissued May 25, 1875.
FIG. I.
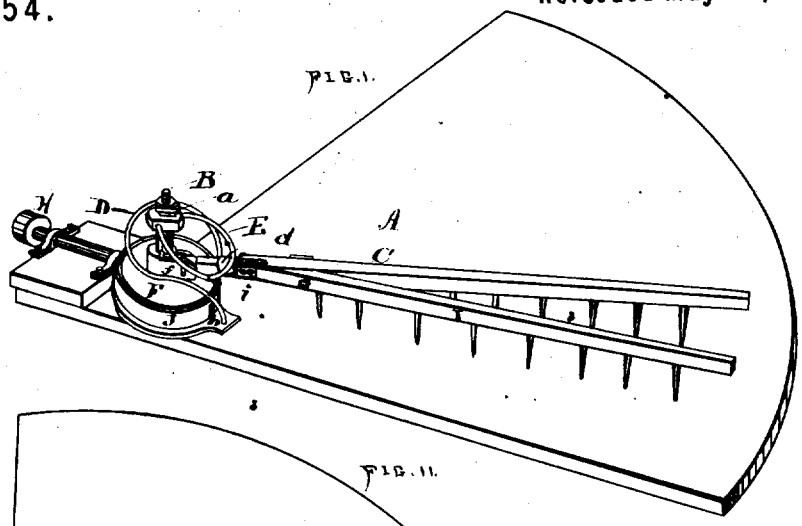
FIG. II.
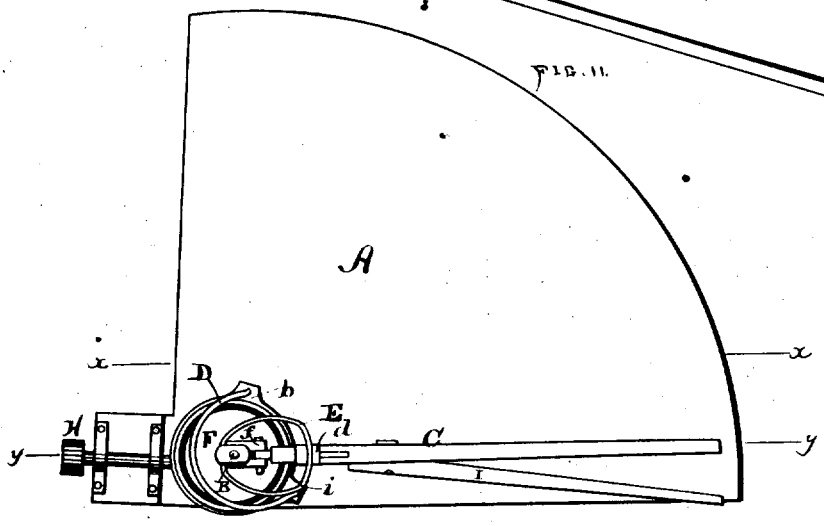
FIG. III.
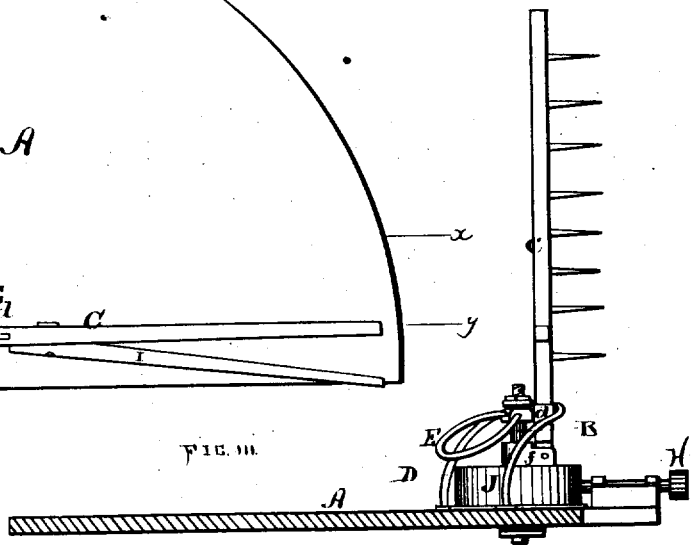
FIG. IV.
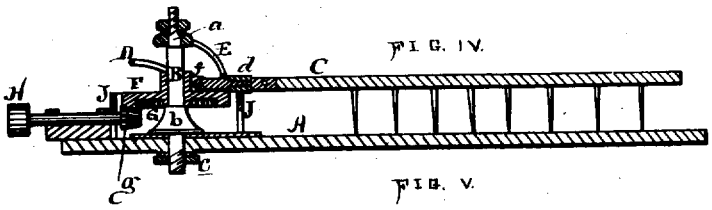
FIG. V.
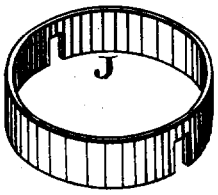
WITNESSES.
F. B. Townsend,
C. McGallaher.
INVENTOR
John H. Mears
By his Atty
R. D. Smith
THE GRAPHIC CO. PHOTO-LITH. 39 & 41 PARK PLACE, N.Y.

UNITED STATES PATENT OFFICE.

JOHN H. MEARS, OF OSHKOSH, WISCONSIN, ASSIGNOR, BY MESNE ASSIGNMENTS, TO REUBEN HOFFHEINS.

IMPROVEMENT IN RAKES FOR HARVESTERS.

Specification forming part of Letters Patent No. 34,584, dated March 4, 1862; reissue No. 6,454, dated May 25, 1875; application filed February 18, 1875.

*To all whom it may concern:*

Be it known that I, JOHN H. MEARS, of Oshkosh, in the county of Winnebago and State of Wisconsin, have invented a new and useful Improved Raking Attachment for Harvesters; and I do hereby declare the following to be a full, clear, and exact description of the same, reference being had to the accompanying drawings, in which—

Figure 1 is a perspective view of my invention. Fig. 2 is a plan of the same. Fig. 3 is a vertical section and elevation on line *x x*, Fig. 2. Fig. 4 is a vertical section on line *y y*, Fig. 2. Fig. 5 is a perspective view of the gearing-shield.

This invention relates to that class of automatic rakes which have a continuous rotary motion in an irregular path, the same being horizontal through that portion which is above the platform, and rising to a vertical position while it is passing the machinery and reel during the remaining portion; and it consists, principally, of the following novel features, viz: First, a rake guideway, which is adjustable around the axis of the rake's revolution, so that the point of engagement for the rake-teeth with the grain upon the platform may be shifted forward or backward, as may be desired; second, a stationary standard to form an axis for the revolution of the rake and control the adjustment of the rake's guideway; third, an upper cam or guide secured to the top of said standard, to keep the rake down upon its guideway; fourth, a friction-roller upon the rake-arm to traverse the guide; fifth, a disk or wheel revolving upon the stationary standard and having the rake-arm hinged to said wheel outside of said axis, so that the rake-arm rises and falls from a point which revolves around the main or stationary axis; sixth, an inclosing shield or cover to protect the gearing and prevent access of straw or other obstructing matter; seventh, a supplemental rake attached to the blade of the principal rake and detachable therefrom.

That others may fully understand my invention, I will fully describe it.

A represents the platform of a harvester with my improved rake attached. Near the front edge of said platform I place the standard B, which constitutes a fixed axis for the revolving rake C. The standard B is provided with an expanded base, *b*, which rests upon the upper side of the platform A, and is conveniently secured thereon by a clamping-nut, *c*, below said platform. The guide D is rigidly secured to the base *b*, and may be rotated with said base around the axis of the standard B, to adjust the movement of the rake so that it will engage with the grain upon the platform at a point more or less near the line of cut, as may be preferred. This adjustment may be effected by simply loosening the clamping-nut beneath the platform, and the tightening again of the same will secure the said base and guide in the desired adjustment. The standard B is made with a square top, *a*, to receive the upper guide E, a hole through which is fitted to the said square *a* of the standard B, and is firmly held thereon by a screw-nut. The arm of the rake C passes below the guide E, and is controlled from above by said guide during that part of its rotation which is above the platform. While the rake is passing over the platform the guide E prevents it from rising if the grain lies thick or light thereon, and forces said rake to take hold and move the grain. The guide D is so fashioned that when the rear edge of the platform has been reached the rake-arm is thereby caused to rise to a vertical position, and remain so along the outer portion of its path not over the platform, while passing the machinery and reel of the harvester, after which it immediately descends again to the platform, immediately in rear of the cutters. The rake-arm therefore moves in a pathway formed and determined by the guide D below and the guide E above, and during its entire course is controlled directly by one or the other of said guides.

The arm of the rake C is provided with a friction-roller, *d*, which traverses the guideway and relieves the rake-arm and guide from friction and wear. The arm of the rake C is jointed at its inner end to a disk or wheel, F, which revolves upon the standard B as an axis, and is supported thereon by a shoulder, *e*. The arm of the rake C is jointed to said wheel F at a point, *f*, outside of the standard B, so that said joint revolves around the axis of said wheel. The disk or wheel F is provided with a cog-rim, G, into which a driving-pinion, *g*, is geared. The motion of the machinery of a harvester is transmitted to the pinion *f* in any of the known methods, one of which is, by means of the band or chain wheel H, connected with said pinion, substantially as shown.

A supplemental rake, I, is bolted to the rear side of the main rake C, near to its inner end, and projects therefrom in the same horizontal plane and at a very acute angle. This supplemental rake may be employed or may be detached, dependent upon the length of the grain to be cut.

I employ a cylindrical shield, J, which fits closely around the disk or wheel F, and extends from the platform nearly to the upper surface of said wheel, but not high enough to interfere with the movement of the rake-arm. The shield J is used for the purpose of preventing the admission of straw or other obstructing matter to clog the gears G *g*.

From the above description it will be seen that, as the machine is drawn along, and the bevel-wheel F is turned in the proper direction, the rake C will sweep across the platform in close contact with it, and rake the cut grain from it, after which it rises up to a vertical position, as shown in Fig. 3, which position it keeps while passing the machinery of the harvester and reel, when it is brought down to the platform, as in Fig. 1.

The device, as a whole, is simple, there being no parts liable to become deranged by use, and can be applied to any of the ordinary harvesters in use.

The rake C is firmly pressed down, while sweeping the platform, by the guide E, under which it passes—the friction-roller *d*, on rake C, coming in contact with the under side of said guide at point *i*.

Having described my invention, what I claim as new is—

1. A a continuously-revolving rake, combined with a controlling guideway, which is adjustable around the center of revolution, to cause said rake to come down upon the platform at any point desired.

2. The standard B around which the rake-driving gearing revolves, in combination with the guideway E affixed to and supported by said standard.

3. In combination with the rake-driving mechanism, the shield J, to cover and protect the same, as set forth.

4. In combination with a rake rotating on a stationary vertical axis, an upper stationary guideway or cam, E, for the purpose of guiding or controlling the rake in its rotation, to cause said rake to be forced down from an upright or vertical position to a horizontal position on the platform of a harvester, and retain said rake in that position until, in its movement, it has swept the grain from the said platform.

5. The combination of an upper guideway or cam, E, with a lower guideway or cam, D, and a rake continuously revolving on a vertical stationary axis.

6. In combination with a continuously-revolving rake hinged to its driving mechanism, the cam-guide D around the outer side of the axis of rotation, and formed so that, after the rake has passed over the platform in a horizontal position, it will be adjusted successively to a vertical position, and again to a horizontal position, as set forth.

7. Combined with the rake C the detachable rake I, substantially as set forth.

8. The combination with the wheel F having the rake-arm hinged thereto, the stationary standard or spindle B, which forms a center for the rake's rotation, and the guideway D E, arranged for joint operation, substantially as shown and described.

JOHN H. MEARS.

Signed in presence of—
W. R. KENNEDY,
E. J. BLOOD.